United States Patent
Chiang et al.

(10) Patent No.: US 12,269,405 B2
(45) Date of Patent: Apr. 8, 2025

(54) MULTIPLE DETECTION SYSTEM

(71) Applicant: PixArt Imaging Inc., Hsin-Chu (TW)

(72) Inventors: Han-Lin Chiang, Hsin-Chu (TW); Shih-Feng Chen, Hsin-Chu (TW); Yen-Min Chang, Hsin-Chu (TW); Ning Shyu, Hsin-Chu (TW); Chih-Wei Huang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 834 days.

(21) Appl. No.: 17/105,620

(22) Filed: Nov. 26, 2020

(65) Prior Publication Data
US 2022/0161748 A1    May 26, 2022

(51) Int. Cl.
*G06F 11/30* (2006.01)
*B60N 2/00* (2006.01)
*B60R 21/015* (2006.01)
*G01G 19/44* (2006.01)

(52) U.S. Cl.
CPC ...... *B60R 21/01516* (2014.10); *B60N 2/0021* (2023.08); *B60N 2/0025* (2023.08); *B60N 2/003* (2023.08); *G01G 19/44* (2013.01); *B60N 2210/40* (2023.08); *B60N 2230/30* (2023.08)

(58) Field of Classification Search
CPC ........ B60R 21/01516; B60R 21/01538; B60R 21/01536; B60N 2/002; G01G 19/44; G01G 19/4142; B60H 1/00742
See application file for complete search history.

(56) References Cited

U.S. PATENT DOCUMENTS

| | | | | |
|---|---|---|---|---|
| 8,054,193 B1* | 11/2011 | Breed | ............... | B60R 21/01516 340/436 |
| 2003/0220766 A1* | 11/2003 | Saunders | ............... | B60N 2/002 702/41 |
| 2005/0043875 A1* | 2/2005 | Bauer | ............... | B60R 21/01516 701/45 |
| 2005/0128123 A1* | 6/2005 | Greneker | ............... | G01S 13/888 342/28 |
| 2005/0154516 A1* | 7/2005 | Dirand | ............... | B60R 21/01556 701/45 |
| 2007/0078351 A1* | 4/2007 | Fujita | ............... | A63B 71/06 600/481 |
| 2014/0347196 A1* | 11/2014 | Schulz | ............... | G08G 1/147 340/932.2 |
| 2019/0156644 A1* | 5/2019 | Lee | ............... | G08B 21/22 |

* cited by examiner

*Primary Examiner* — Phuong Huynh
(74) *Attorney, Agent, or Firm* — Winston Hsu

(57) ABSTRACT

A multiple detection system is applied to a vehicle and includes a contact-type detection module adapted to generate a contact-type detection datum, a contactless-type detection module adapted to generate a contactless-type detection datum, and an operation processor electrically connected with the contact-type detection module and the contactless-type detection module in a wire manner or in a wireless manner. The operation processor sets at least one of the contact-type detection datum and the contactless-type detection datum according to an environmental status of the vehicle to be a main detection result of the multiple detection system, and further sets the other detection datum to be an auxiliary detection result of the multiple detection system, for acquiring a passenger feature inside the vehicle.

12 Claims, 7 Drawing Sheets

MULTIPLE DETECTION SYSTEM

BACKGROUND OF THE INVENTION

1. Field of the Invention

The present invention relates to a multiple detection system, and more particularly, to a multiple detection system applied to a vehicle for providing accurate detection result.

2. Description of the Prior Art

A conventional detection system in the car determines whether a passenger sits on the specific seat by actuation of the safety belt. If the passenger sits on the seat but does not use the safety belt, the conventional detection system cannot acquire an accurate detection result. For overcoming the foresaid problem, a weight detector may be disposed under the seat. The weight detector can determine an adult sits on the seat if detecting a weight over a specific value, and determine a child sits on the seat if detecting the weight under the specific value; however, if an object is put on the seat, such as a box or a safety seat, the weight detector is actuated by the weight of the object, which results in an erroneous result of the passenger detection system in the car; the conventional detection system in the car cannot accurately determine existence of the passenger.

SUMMARY OF THE INVENTION

The present invention provides a multiple detection system applied to a vehicle for providing accurate detection result for solving above drawbacks.

According to the claimed invention, a multiple detection system applied to a vehicle is disclosed. The multiple detection system includes a contact-type detection module adapted to generate a contact-type detection datum, a contactless-type detection module adapted to generate a contactless-type detection datum, and an operation processor electrically connected with the contact-type detection module and the contactless-type detection module in a wire manner or in a wireless manner. The operation processor sets at least one of the contact-type detection datum and the contactless-type detection datum according to an environmental status of the vehicle to be a main detection result of the multiple detection system, and further sets the other detection datum to be an auxiliary detection result of the multiple detection system, for acquiring a passenger feature inside the vehicle.

According to the claimed invention, the operation processor adjusts the main detection result by the auxiliary detection result to generate detection output of the multiple detection system, or omits the auxiliary detection result and utilizes the main detection result to generate the detection output of the multiple detection system.

According to the claimed invention, the contactless detection module is further adapted to acquire the environmental status of the vehicle, and the operation processor compares the environmental status with a first threshold condition and then determines the contactless detection datum belongs to the main detection result or the auxiliary detection result according to a comparison result.

According to the claimed invention, the operation processor determines the contactless detection datum belongs to the main detection result when the environmental status conforms to the first threshold condition, the operation processor further determines the contactless detection datum belongs to the auxiliary detection result when the environmental status does not conform to the first threshold condition.

According to the claimed invention, when the environmental status conforms to the first threshold condition, the operation processor only sets the contactless detection datum as detection output of the multiple detection system, or sets a weighted value transformed from the contact-type detection datum and the contactless-type detection datum as the detection output of the multiple detection system.

According to the claimed invention, the contact-type detection module includes a plurality of contact-type detectors, and the operation processor compares an actuation distribution with a second threshold condition and then determines the contact detection datum belongs to the main detection result or the auxiliary detection result according to a comparison result.

According to the claimed invention, the operation processor determines the contact detection datum belongs to the main detection result when the actuation distribution conforms to the second threshold condition, the operation processor further determines the contact detection datum belongs to the auxiliary detection result when the actuation distribution does not conform to the second threshold condition.

According to the claimed invention, when the actuation distribution conforms to the second threshold condition, the operation processor only sets the contact detection datum as detection output of the multiple detection system, or sets a weighted value transformed from the contact-type detection datum and the contactless-type detection datum as the detection output of the multiple detection system.

According to the claimed invention, when the environmental status conforms to the first threshold condition and the actuation distribution conforms to the second threshold condition, the operation processor sets the at least one of the contact-type detection datum and the contactless-type detection datum as detection output of the multiple detection system.

According to the claimed invention, when the environmental status does not conform to the first threshold condition and the actuation distribution does not conform to the second threshold condition, the operation processor executes calibration of the contact-type detection module and the contactless-type detection module to refresh the environmental status and the actuation distribution.

According to the claimed invention, the contact-type detection module is a pressure detection module, and the contactless-type detection module is a sonic detection module and/or an optical detection module.

According to the claimed invention, the pressure detection module detect pressure applied to the multiple detection system via capacitance material, resistance material or piezoelectric material.

According to the claimed invention, the sonic detection module determines the passenger feature via phase difference between an outputted sonic signal and a received sonic signal.

According to the claimed invention, the optical detection module determines the passenger feature via analysis of a detection image.

The multiple detection system of the present invention can utilize many kind of detection technology, such as the pressure detection, the sonic detection and the optical detection, to integrate the foresaid detection results and then determine the sizes, the amounts and the positions of the passenger or the box of the safety seat inside the vehicle. If the passengers inside the vehicle are confirmed, related information of the passengers can be transmitted to a control system of the vehicle, and specific functions (such as the air condition or the air bag) can be actuated accordingly for increasing comfort and security of sitting in the vehicle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
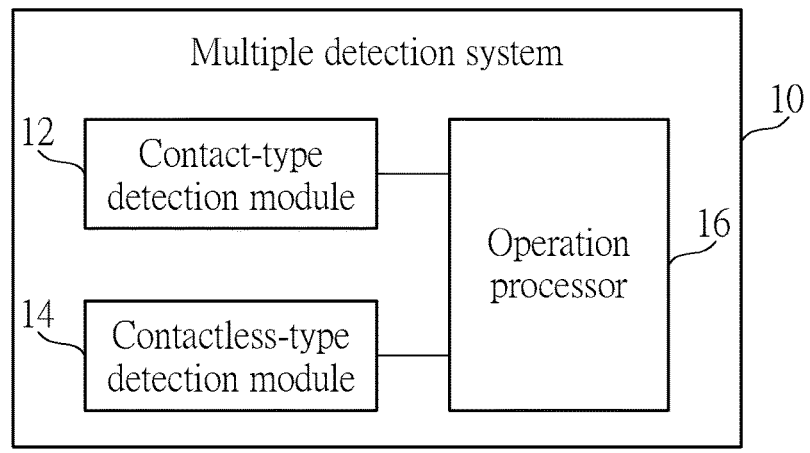
FIG. 1 is a functional block diagram of a multiple detection system according to an embodiment of the present invention.

Please refer to FIG. 1. FIG. 1 is a functional block diagram of a multiple detection system 10 according to an embodiment of the present invention. The multiple detection system 10 can be applied to a vehicle, for detecting a size, an amount and a position of the passenger in the vehicle. The vehicle can be a private car, a public bus, a ship or an airplane. The multiple detection system 10 can output a warning message to remind the passenger according to a type and an environmental status of the vehicle. For example, if the vehicle is the moving car, the multiple detection system 10 can detect whether an adult passenger or a child passenger is in the car and correctly belted; if the vehicle is the car stayed in the snow and rainy day, the multiple detection system 10 can detect whether the passenger sitting on the seat is warmed by the air condition. Further, when the multiple detection system 10 detects the passengers sits on some of the vehicle seats, the air condition can only provide warm airflow or cool airflow toward the occupied seats, or only the air bags on the occupied seats are actuated for protection.

The multiple detection system 10 can include a contact-type detection module 12, a contactless-type detection module 14 and an operation processor 16. The contact-type detection module 12 can be the pressure detection module, which may utilize capacitance material, resistance material or piezoelectric material to detect pressure and then generate a contact-type detection datum. The contactless-type detection module 14 can be the sonic detection module or the optical detection module, and adapted to generate a contactless-type detection datum. The sonic detection module can utilize phase difference between an outputted sonic signal and a received sonic signal to execute echolocation. The optical detection module can capture and analyze a series of detection images to determine the passenger's features. It should be mentioned that the contact-type detection module 12 and the contactless-type detection module 14 are not limited to the above-mentioned embodiments. The operation processor 16 can be electrically connected to the contact-type detection module 12 and the contactless-type detection module 14 in a wire manner or in a wireless manner. The operation processor 16 can analyze the environmental status of the vehicle to choose at least one of the contact-type detection datum and the contactless-type detection datum to be a main detection result of the multiple detection system 10, and the other detection datum which is not used as the main detection result can be an auxiliary detection result of the multiple detection system 10, so as to accurately determine the passenger's features in the vehicle.

Figure 2:
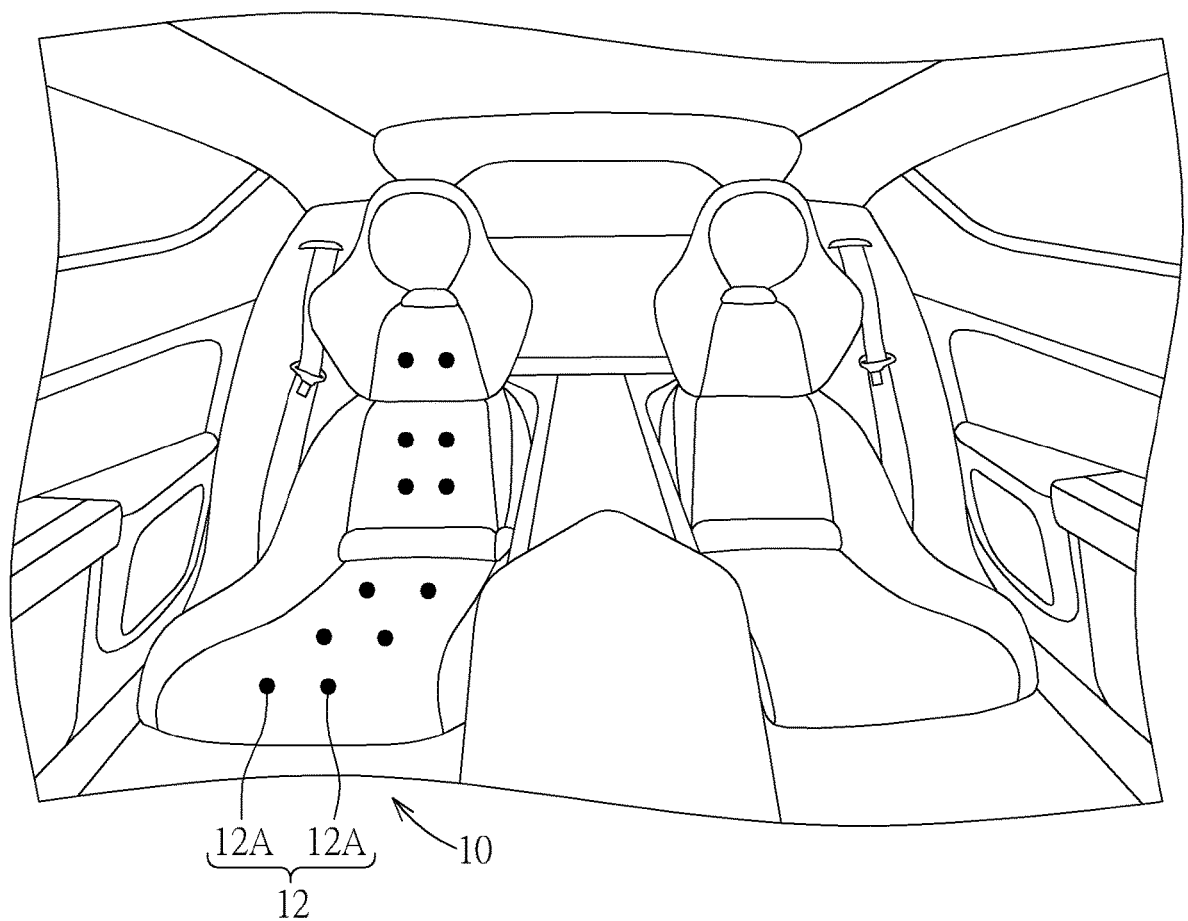
FIG. 2 is a diagram of a contact-type detection module according to the embodiment of the present invention.
Figure 3:
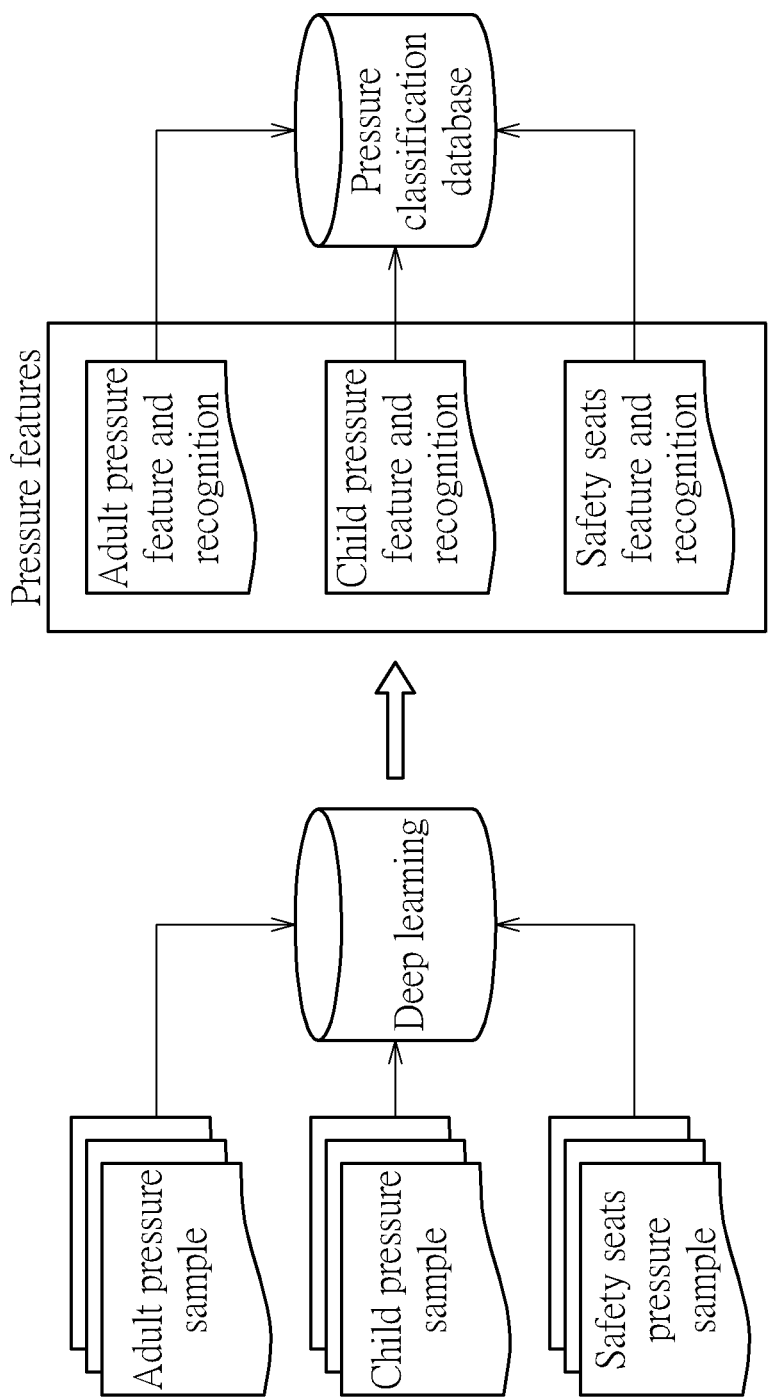
FIG. 3 is an operational block diagram of the contact-type detection module according to the embodiment of the present invention.

Please refer to FIG. 2 and FIG. 3. FIG. 2 is a diagram of the contact-type detection module 12 according to the embodiment of the present invention. FIG. 3 is an operational block diagram of the contact-type detection module 12 according to the embodiment of the present invention. The detection module 12 can include a plurality of pressure detection units 12A (which means contact-type detectors). The plurality of pressure detection units 12A may be arranged as a matrix located on the vehicle seat, or may be distributed on a seat portion, a waist portion and a back portion of the vehicle seat. Generally, if the adult passenger sits on the vehicle seat, the pressure detection units 12A set on the seat portion, the waist portion and the back portion can detect weight; if the child passenger sits on the vehicle seat, the pressure detection units 12A set on the seat portion and the waist portion can detect the weight, but the pressure detection unit 12A set on the back portion cannot detect the weight due to short body height of the child passenger; if an object is put on the vehicle seat, the pressure detection unit 12A set on the seat portion can detect the weight, and the pressure detection units 12A set on the waist portion and the back portion cannot detect the weight. The contact-type detection module 12 can determine existence and a category of the unknown object on the vehicle seat according to the actuation distribution of the pressure detection units 12A.

In some possible situations, an actual application of the contact-type detection module 12 is not limited to the said embodiments. For example, the adult passenger or the child passenger may lie on the vehicle seat or lean toward the window, and the objects may have different sizes and shapes, so that the pressure detection units 12A on the seat portion, the waist portion and the back portion may have specific actuation distribution different form the foresaid embodiments due to many unexpected factors. Thus, the contact-type detection module 12 of the present invention preferably can collect lots of passenger samples with a variety of body sizes and object samples with a variety of shapes, and utilize convolutional neural network to execute a deep learning function, so as to extract feature vectors of the passenger samples and the object samples in all layers and then establish a classification database, for increasing the determination speed and accuracy. The said object samples can be boxes and/or safety seats. When a weight distribution datum of the unknown object is detected, the contact-type detection module 12 can determine whether the unknown object belongs to the passenger or the safety seat according to the deep learning result, and further may decide the sizes of the passenger or the shape of the box/the safety seat. In addition, if the weight distribution datum of the unknown object is confirmed by other verification, a confirmed result can be feedback to the convolutional neural network, and the determination speed and accuracy of the deep learning function can be gradually increased accordingly.

Figure 4:
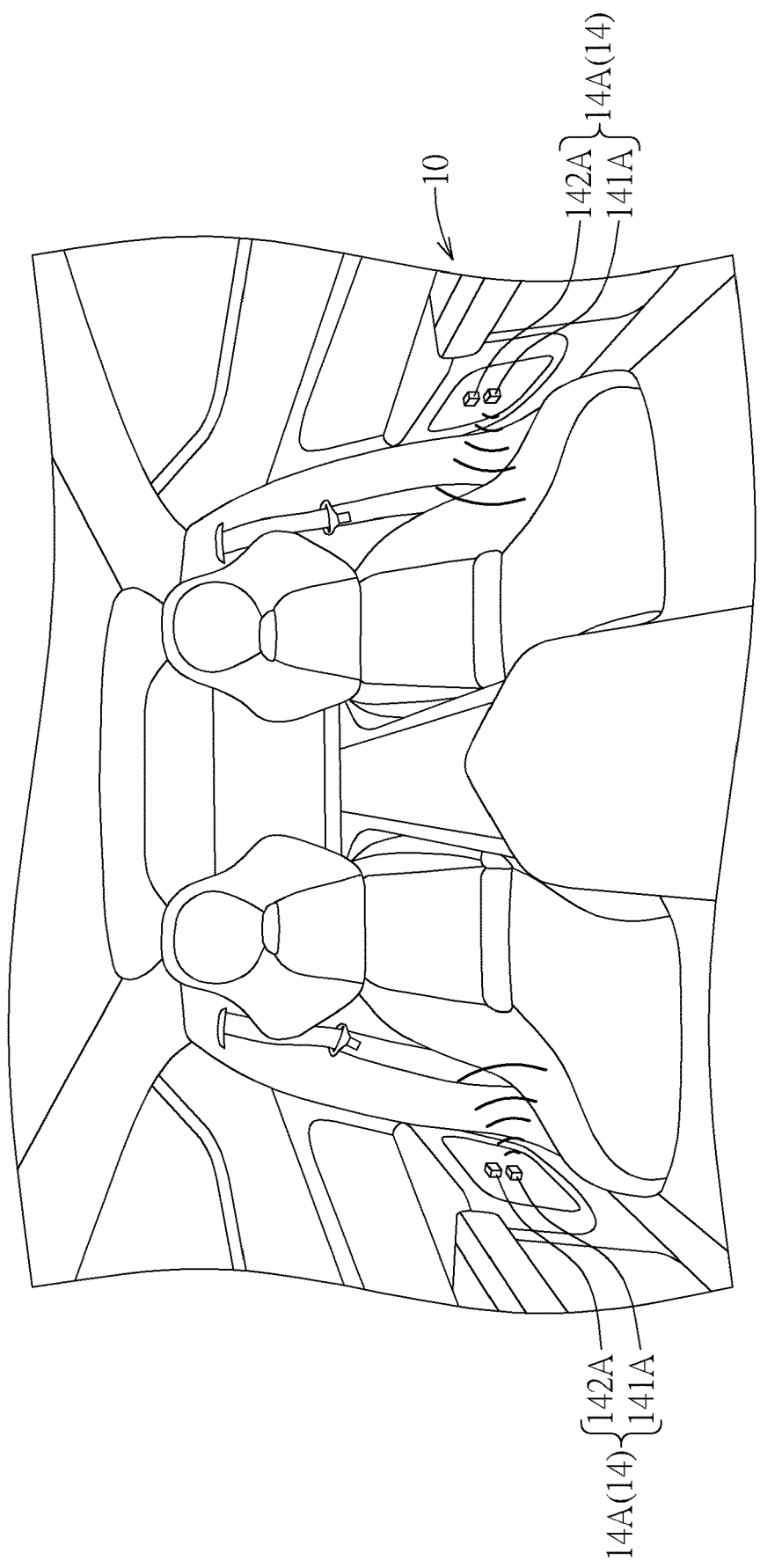
FIG. 4 is a diagram of a contactless-type detection module utilizing sonic detection technology according to the embodiment of the present invention.
Figure 5:
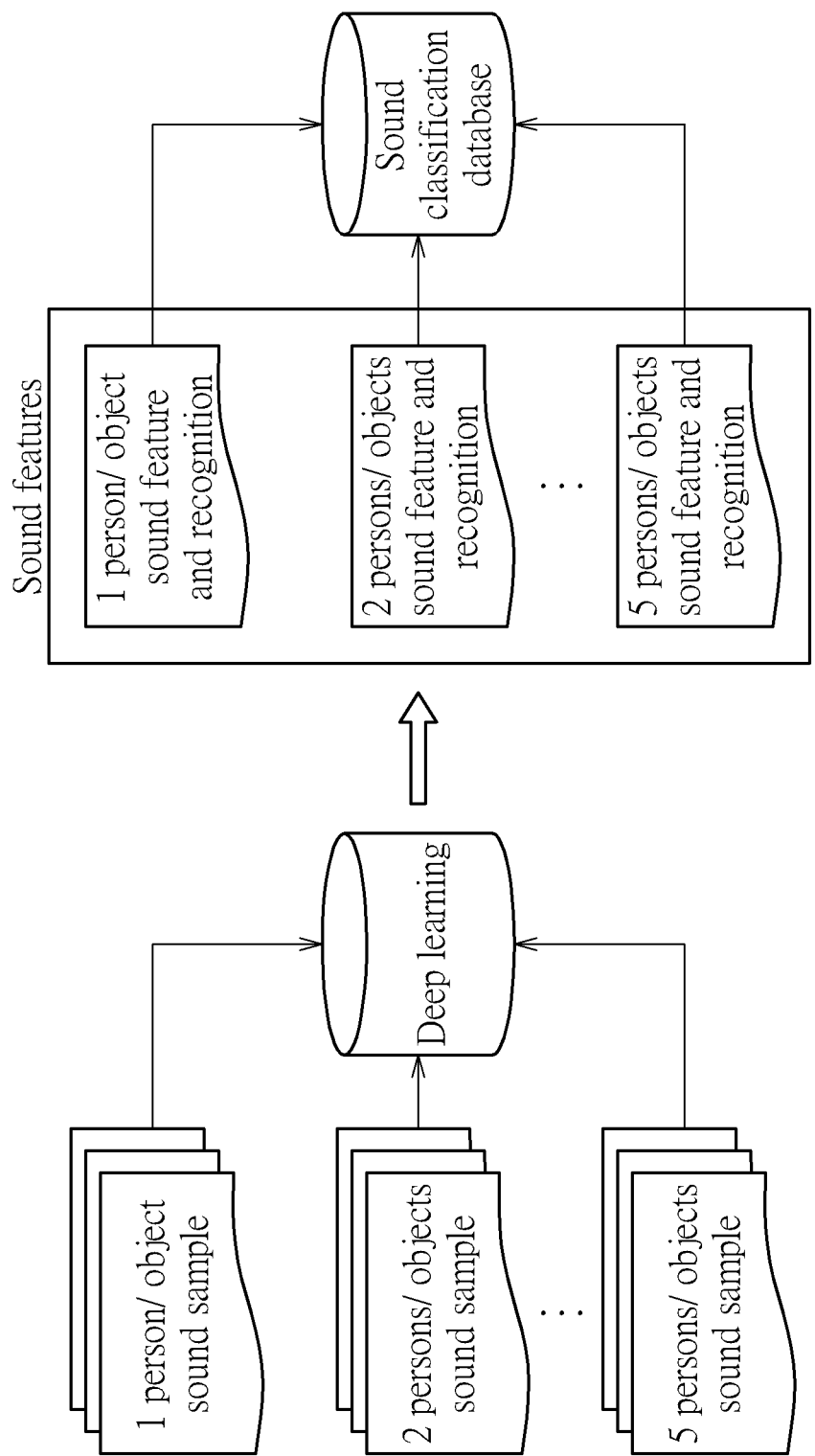
FIG. 5 is an operational block diagram of the contactless-type detection module utilizing the sonic detection technology according to the embodiment of the present invention.

Please refer to FIG. 4 and FIG. 5. FIG. 4 is a diagram of the contactless-type detection module 14 utilizing sonic detection technology according to the embodiment of the present invention. FIG. 5 is an operational block diagram of the contactless-type detection module 14 utilizing the sonic detection technology according to the embodiment of the present invention. The sonic detection module 14A can include a sonic wave output 141A and a sonic wave receiver 142A. The sonic wave output 141A can be a speaker of the vehicle, and used to output a sonic wave/signal that can be heard by a human ear or an ultrasonic wave/signal that cannot be heard by the human ear. The sonic wave receiver 142A can be disposed adjacent to the sonic wave output 141A and used to receive the sonic wave/signal or the ultrasonic wave/signal reflected from the passenger or the safety seat. The sonic detection module 14A can utilize the phase difference between the outputted sonic/ultrasonic wave or signal and the received sonic/ultrasonic wave or signal to execute the echolocation, so as to acquire the position and amount of the passenger or the safety seat.

The sonic detection module 14A can utilize the convolutional neural network to execute the deep learning function. The sonic detection module 14A can collect a larger number of the passenger samples and the object samples for establishing the classification database, such as storing the phase difference about different numbers of the passenger within the classification database, and then define the echolocation about the passenger samples with a variety of body sizes and about the object samples with a variety of shapes. If acquiring the sonic/ultrasonic signal phase difference about the unknown object, the sonic detection module 14A can utilize the deep learning result to determine the position and amount of the passenger or the safety seat. Besides, a relation between the sonic/ultrasonic signal phase difference of the unknown object and the position and amount of the passenger or the safety seat can be feedback to the convolutional neural network for increasing the determination speed and accuracy of the deep learning function.

Figure 6:
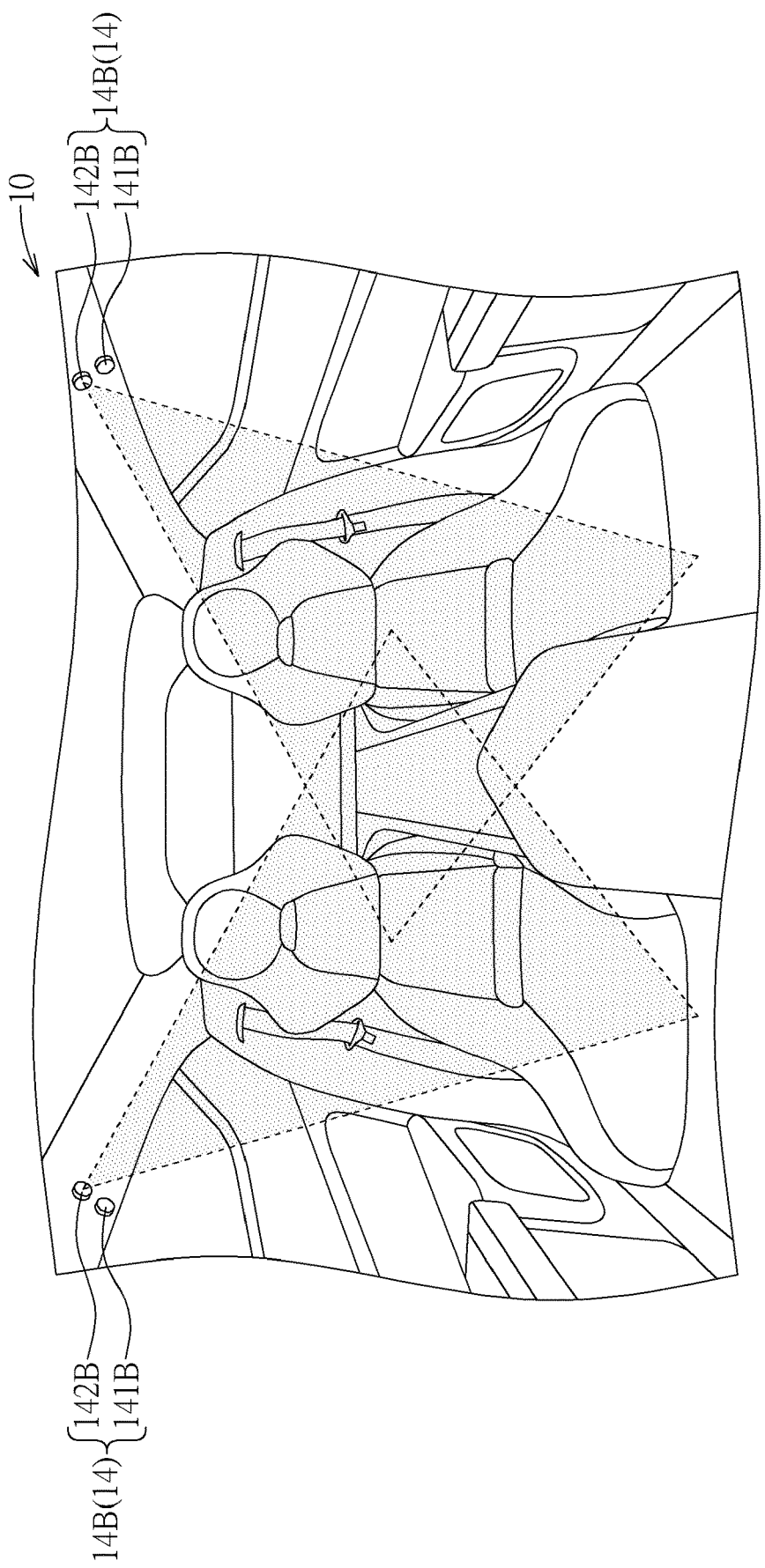
FIG. 6 is a diagram of the contactless-type detection module utilizing optical detection technology according to the embodiment of the present invention.
Figure 7:
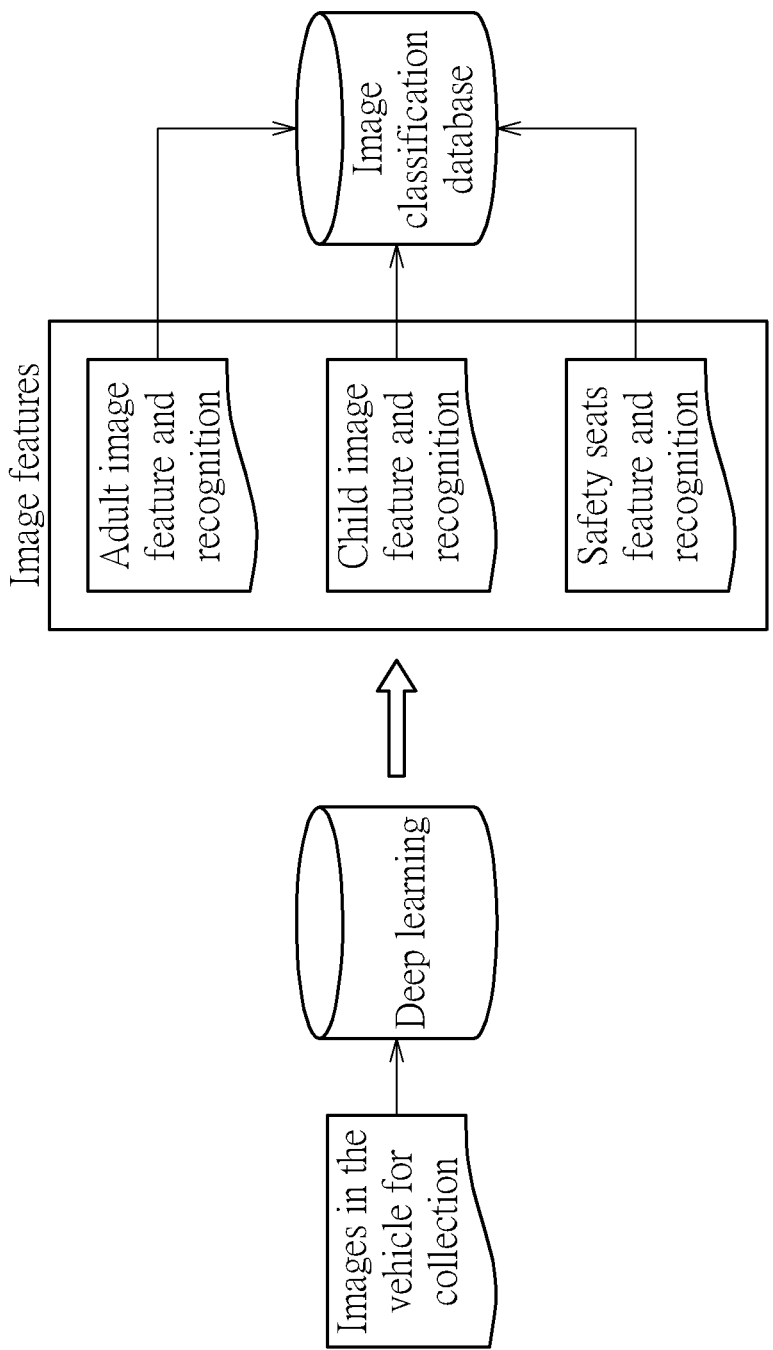
FIG. 7 is an operational block diagram of the contactless-type detection module utilizing the optical detection technology according to the embodiment of the present invention.

Please refer to FIG. 6 and FIG. 7. FIG. 6 is a diagram of the contactless-type detection module 14 utilizing optical detection technology according to the embodiment of the present invention. FIG. 7 is an operational block diagram of the contactless-type detection module 14 utilizing the optical detection technology according to the embodiment of the present invention. The optical detection module 14B can include a light source 141B and a camera 142B. The light source 141B can be an optional unit used to provide an illumination beam. A monitoring region of the camera 142B can cover an inner space of the vehicle, and the camera 142B can acquire a detection image relevant to the passenger or the safety seat inside the vehicle. When the series of detection images is acquired, the optical detection module 14B can utilize the deep learning function of the convolutional neural network to collect the feature vectors of the passenger samples and the object samples within the series of detection images, and then classify and identify the feature vectors to establish the classification database. For analysis of the unknown object within the detection image, the human body detection technology can be executed to determine whether the unknown object belongs to the passenger or the safety seat according to the classification database; when the unknown object is determined as the passenger, the human face detection technology can be executed to decide the passenger is the adult or the child, or decide an identity of the passenger according to the classification database.

Figure 8:
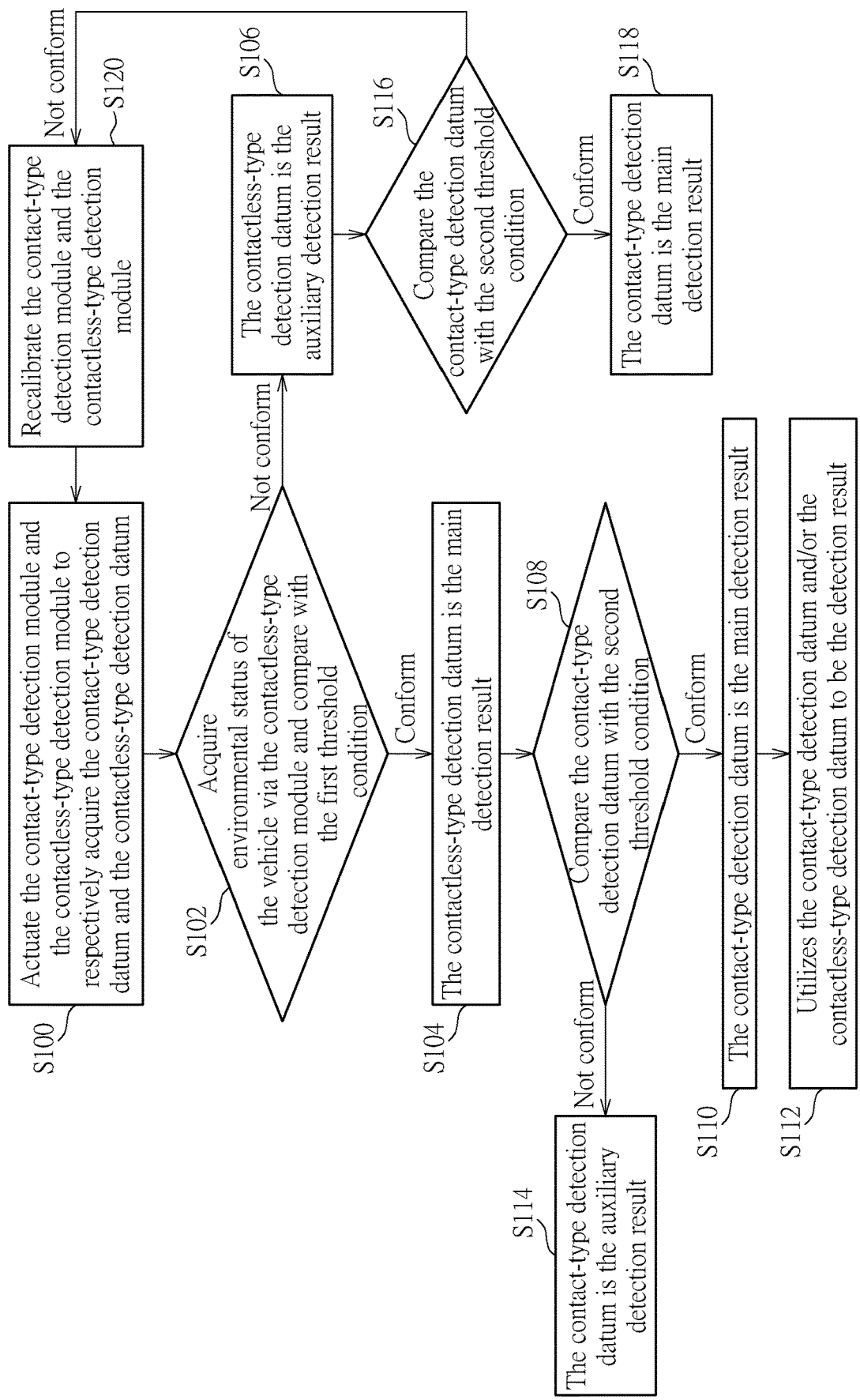
FIG. 8 is a flow chart of a method applied to the multiple detection system 10 according to the embodiment of the present invention.

Please refer to FIG. 8. FIG. 8 is a flow chart of a method applied to the multiple detection system 10 according to the embodiment of the present invention. First, step S100 is executed to actuate the contact-type detection module 12 and the contactless-type detection module 14 for respectively acquiring the contact-type detection datum and the contactless-type detection datum. Then, a reliability of the contactless-type detection module 14 can be determined by execution of step S102, which means the contactless-type detection module 14 acquires the environmental status of the vehicle and compares the environmental status with a first threshold condition. As the contactless-type detection module 14 is the sonic detection module, the environmental status can be music volume played by the speaker in the vehicle, or noise volume from a horn of other vehicle; as the contactless-type detection module 14 is the optical detection module, the environmental status can be illumination around the vehicle, which is changed in the daytime or in the night, or changed when the vehicle is in the open ground or in the tunnel. The first threshold condition can be a preset value related to a detection category of the contactless-type detection module, so that the first threshold condition can be a decibel value or an intensity value. An actual value of first threshold condition can be changed and depend on the design demand, and a detailed description is omitted herein for simplicity.

If the environmental status conforms to the first threshold condition, the vehicle may be in a quiet place so the sonic detection module has preferred accuracy, or the vehicle may be in a well-lit place so the optical detection module has preferred accuracy, and step S104 is executed to determine the contactless-type detection datum is the main detection result; meanwhile, only the contactless-type detection datum can be used as detection output of the multiple detection system 10, or a weighted value transformed by the contact-type detection datum and the contactless-type detection datum can be used as the detection output of the multiple detection system 10. If the environmental status does not conform to the first threshold condition, the vehicle may be in a noisy place so the sonic detection module has low accuracy, or the vehicle may be in a dark place so the optical detection module has low accuracy, and step S106 is executed to determine the contactless-type detection datum is the auxiliary detection result; the multiple detection system 10 needs to determine whether the contact-type detection datum is only used as the detection output of the multiple detection system 10.

Then, the reliability of the contact-type detection module 12 can be determined by execution of step S108 for comparing the actuation distribution of the contact-type detection datum with a second threshold condition. The actuation distribution may be changed in accordance with one embodiment that the pressure detection units 12A are arranged as the matrix on the vehicle seat or another embodiment that pressure detection units 12A are distributed on the seat portion, the waist portion and the back portion of the vehicle seat. Disposition of the pressure detection units 12A are not limited to the above-mentioned embodiments, and a detailed description is omitted herein for simplicity. The second threshold condition can be represented as distribution density or location of the pressure detection unit 12A, which depends on the design demand. If the actuation distribution conforms to the second threshold condition, the contact-type detection module 12 may detect the weight of the buttocks, the waist and the back of the unknown object and determine the unknown object is the passenger, so that steps S110 and S112 are executed to determine the contact-type detection datum is the main detection result, and only the contact-type detection datum can be used as the detection output of the multiple detection system 10, or the weighted value transformed by the contact-type detection datum and the contactless-type detection datum can be used as the detection output of the multiple detection system 10.

If the actuation distribution does not conform to the second threshold condition, the contact-type detection module 12 may only detect the bottom weight of the unknown object, or the weight distribution of the unknown object is dissimilar from the passenger, which means the unknown object cannot be decided as the passenger or the box or the safety seat, and then step S114 is executed to determine the contact-type detection datum is the auxiliary detection result. Thus, the auxiliary detection result (which means the contact-type detection datum) can be used to adjust the main detection result (which means contactless-type detection datum) for generating the detection output of the multiple detection system 10, or the auxiliary detection result (which means contact-type detection datum) can be neglected and only the main detection result (which means contactless-type detection datum) is used as the detection output of the multiple detection system 10.

Step S116 is executed after step S106 to compare the actuation distribution of the contact-type detection datum with the second threshold condition. If the actuation distribution conforms to the second threshold condition, the unknown object may be the passenger, so step S118 is executed to determine the contact-type detection datum is the main detection result; meanwhile, only the contact-type detection datum (which means the main detection result) can be used as the detection output of the multiple detection system 10, or the weighted value transformed by the contact-type detection datum (which means the main detection result) and the contactless-type detection datum (which means the auxiliary detection result) can be used as the detection output of the multiple detection system 10. If the actuation distribution does not conform to the second threshold condition, the unknown object cannot be decided as the passenger or the safety seat, and step S120 is executed that the multiple detection system 10 can recalibrate the contact-type detection module 12 and the contactless-type detection module 14 for newly acquiring the environmental status, the contactless-type detection datum and the contact-type detection datum.

In conclusion, the multiple detection system of the present invention can utilize many kind of detection technology, such as the pressure detection, the sonic detection and the optical detection, to integrate the foresaid detection results and then determine the sizes, the amounts and the positions of the passenger or the box of the safety seat inside the vehicle. If the passengers inside the vehicle are confirmed, related information of the passengers can be transmitted to a control system of the vehicle, and specific functions (such as the air condition or the air bag) can be actuated accordingly for increasing comfort and security of sitting in the vehicle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multiple detection system applied to a vehicle, the multiple detection system comprising:
    a contact-type detection module adapted to generate a contact-type detection datum of a passenger feature, the contact-type detection module comprising a plurality of contact-type detectors;
    a contactless-type detection module adapted to generate a contactless-type detection datum of the passenger feature and further to acquire an environmental status of the vehicle; and
    an operation processor electrically connected with the contact-type detection module and the contactless-type detection module in a wire manner or in a wireless manner, the operation processor comparing the environmental status with a first threshold condition, comparing an actuation distribution of the plurality of contact-type detectors with a second threshold condition, determining the contactless-type detection datum belongs to one of a main detection result and an auxiliary detection result according to a comparison result of the environmental status and the first threshold condition, and further determining the contact-type detection datum belongs to one of the main detection result and the auxiliary detection result according to another comparison result of the actuation distribution and the second threshold condition, for acquiring the passenger feature inside the vehicle.

2. The multiple detection system of claim 1, wherein the operation processor adjusts the main detection result by the auxiliary detection result to generate detection output of the multiple detection system, or omits the auxiliary detection result and utilizes the main detection result to generate the detection output of the multiple detection system.

3. The multiple detection system of claim 1, wherein the operation processor determines the contactless-type detection datum belongs to the main detection result when the environmental status conforms to the first threshold condition, the operation processor further determines the contactless-type detection datum belongs to the auxiliary detection result when the environmental status does not conform to the first threshold condition.

4. The multiple detection system of claim 1, wherein when the environmental status conforms to the first threshold condition, the operation processor only sets the contactless-type detection datum as detection output of the multiple detection system, or sets a weighted value transformed from the contact-type detection datum and the contactless-type detection datum as the detection output of the multiple detection system.

5. The multiple detection system of claim 1, wherein the operation processor determines the contact-type detection datum belongs to the main detection result when the actuation distribution conforms to the second threshold condition, the operation processor further determines the contact-type detection datum belongs to the auxiliary detection result when the actuation distribution does not conform to the second threshold condition.

6. The multiple detection system of claim 1, wherein when the actuation distribution conforms to the second threshold condition, the operation processor only sets the contact-type detection datum as detection output of the multiple detection system, or sets a weighted value transformed from the contact-type detection datum and the contactless-type detection datum as the detection output of the multiple detection system.

7. The multiple detection system of claim 1, wherein when the environmental status conforms to the first threshold condition and the actuation distribution conforms to the second threshold condition, the operation processor sets the at least one of the contact-type detection datum and the contactless-type detection datum as detection output of the multiple detection system.

8. The multiple detection system of claim 1, wherein when the environmental status does not conform to the first threshold condition and the actuation distribution does not conform to the second threshold condition, the operation processor executes calibration of the contact-type detection module and the contactless-type detection module to refresh the environmental status and the actuation distribution.

9. The multiple detection system of claim 1, wherein the contact-type detection module is a pressure detection module, and the contactless-type detection module is a sonic detection module and/or an optical detection module.

10. The multiple detection system of claim 9, wherein the pressure detection module detects pressure applied to the multiple detection system via capacitance material, resistance material or piezoelectric material.

11. The multiple detection system of claim 9, wherein the sonic detection module determines the passenger feature via phase difference between an outputted sonic signal and a received sonic signal.

12. The multiple detection system of claim 9, wherein the optical detection module determines the passenger feature via analysis of a detection image.

\* \* \* \* \*